April 4, 1967 R. L. ROGERS 3,312,973

AUTOMATIC ANTENNA POSITIONING SYSTEM

Filed Aug. 20, 1965 2 Sheets-Sheet 1

INVENTOR.
ROY L. ROGERS

BY John F. Lawler
ATTORNEY

INVENTOR.
ROY L. ROGERS
BY John F. Lawler
ATTORNEY

3,312,973
AUTOMATIC ANTENNA POSITIONING SYSTEM

Roy L. Rogers, Sunnyvale, Calif., assignor to Sylvania Electric Products Inc., a corporation of Delaware Filed Aug. 20, 1965, Ser. No. 481,267
10 Claims. (Cl. 343—117)

This invention relates to antenna positioning systems and more particularly to an inexpensive automatic antenna positioning system for operating in cooperation with home entertainment equipment such as FM radio and television receivers and amateur radio equipment.

When a television receiver is tuned to receive any one channel, reception is optimum when the receiving antenna is pointed toward the transmitting antenna of the station for that channel. When the television receiver is tuned to a different channel, reception is usually optimum when the antenna is pointed in a different direction, toward the transmitting antenna of the other station. The more widespread inexpensive practice is to point the antenna in a direction that gives fair reception for the channels most often observed. Marginal reception is tolerated for other channels. It would be desirable to point the antenna in the direction for optimum reception each time a different channel is selected for viewing. Rotatable antennas positioned by synchros are available to do this but require that the operator manually adjust the system each time a new channel is selected for viewing. Presently available automatic antenna positioning techniques are complex and too expensive for use in many applications such as commercial home entertainment equipment.

An object of this invention is the provision of an antenna positioning system for automatically aligning an antenna in the direction for peak reception of a prescribed signal.

Another object is the provision of an automatic antenna positioning system employing standard commercially available components and which is simple and economical to construct.

In accordance with this invention, the directional antenna associated with a receiver operates in a scanning mode and rotates in search of electromagnetic signals having a predetermined frequency to which the receiver is tuned. Received signals are detected and a signal representative of the peak received signal is stored. When the peak signal is again received, the antenna functions in a peak-seeking mode and scans a sector including the direction of the peak received signal. The antenna is stopped after a predetermined time in the peak-seeking mode or when the angular width of the sector is reduced to a predetermined value. In one embodiment of this invention, operation in the peak-seeking mode is accomplished by a differential amplifier that is responsive to the difference between the received signal and the stored peak signal for controlling the operating state of a multivibrator and thus rotation of the antenna. In another embodiment of this invention, operation in the peak-seeking mode is controlled by a first zero-crossing sensor that is responsive to signals representative of the rate of change of the received signal for generating error signals to converge the antenna to the direction of the peak received signal. A second zero-crossing sensor aids in driving the antenna toward the direction of the peak received signal.

This invention and these and other objects thereof will be more fully understood from the following description of a preferred embodiment thereof together with the accompanying drawings in which:

FIGURES 4A and 4B are waveforms illustrating the operation of the circuit of FIGURE 3.

Figure 1:
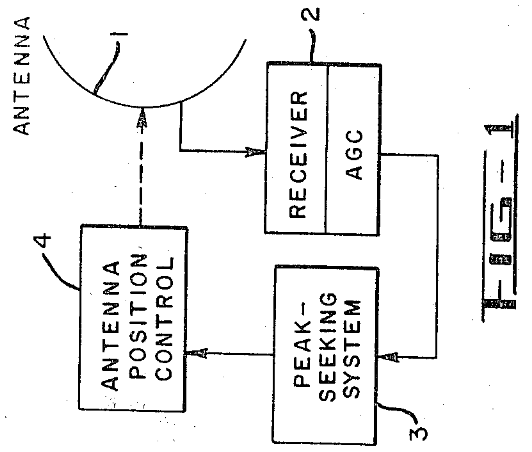
FIGURE 1 is a schematic diagram of a receiver system embodying this invention.

Referring to FIGURE 1, the receiver system comprises receiving antenna 1, receiver 2, peak-seeking system 3 and antenna position control circuit 4. Antenna 1 is a directional antenna having a high front to back ratio and may employ a parabolic reflector as shown, or may be the popular log-periodic type used for home television sets. The antenna is rotatable about a feed point axis which is normal to the direction of propagation and may rotate through 360 degrees or scan a limited sector.

Receiver 2 is a tunable receiver such as a television receiver, an FM receiver or a receiver employed in direction finding systems. The receiver generates signals representative of the magnitudes of signals received by the antenna that have the predetermined frequency to which the receiver is tuned. This receiver output may be the automatic gain control (AGC) voltage of the receiver.

Peak-seeking system 3 is responsive to the AGC voltage for seeking the peak value thereof. The peak-seeking system stores the peak value of the AGC voltage and generates a control signal when the AGC voltage again reaches the stored peak value. The control signals biases antenna position control circuit 4 to cause the antenna to scan a sector including the peak received signal. After the antenna has scanned the sector for a predetermined time interval, the peak seeking system generates an output which causes the antenna position control circuit to stop movement of the antenna.

Figure 2:
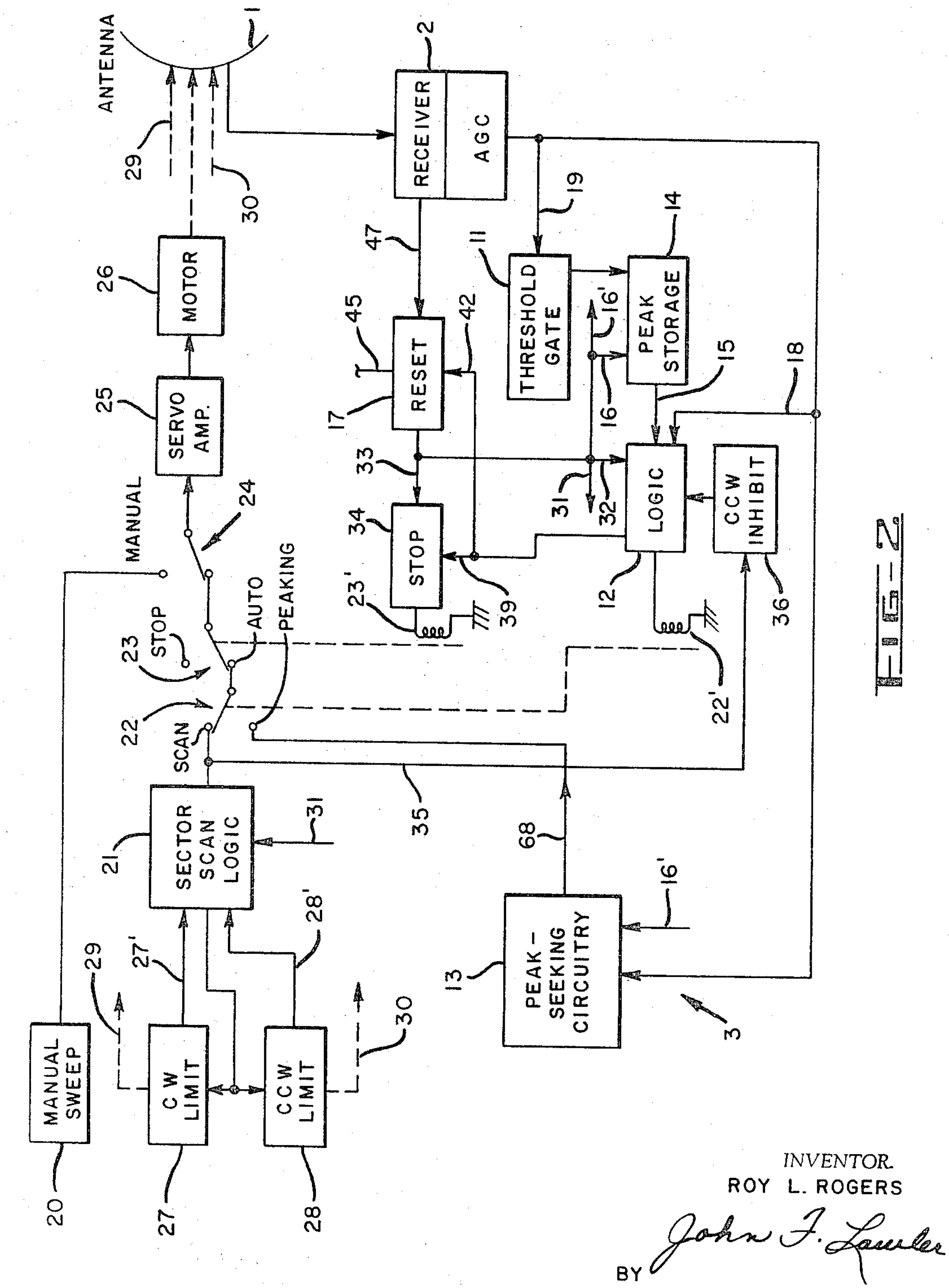
FIGURE 2 is a detailed schematic and block diagram of the system of FIGURE 1.

Referring to FIGURE 2, the peak-seeking system 3 comprises threshold gate 11, logic circuit 12 and peak-seeking circuit 13, each responsive to the AGC voltage from the receiver. The output of gate 11 is applied to peak storage circuit 14. The threshold gate establishes a minimum signal level that the AGC voltage must exceed before it is passed to and stored by the peak storage circuit. Threshold gate 11 may comprise a Schmitt trigger that controls the operation of an AND gate.

Peak storage 14 stores the peak AGC voltage passed by the threshold gate. The output of the peak storage is applied on line 15 to logic circuit 12. Peak storage circuit 14 may comprise a capacitor for storing the AGC voltage and a steering diode (not shown). The steering diode, connected between the capacitor and the output of gate 11, enables the capacitor to store a signal representative of the largest AGC voltage applied to the peak storage. A field effect transistor connected between the capacitor and the output of the peak storage provides a high impedance output circuit which prevents the capacitor from discharging during storage of the AGC voltage. The peak storage may be reset at any time by a control signal on line 16 from reset circuit 17.

Logic circuit 12 compares the AGC voltage on line 18 (from the receiver) with the signal on line 15 (the peak AGC voltage stored by the peak storage) to determine when the receiving antenna is aligned in the direction of the peak received signal. The logic circuit may be designed in accordance with considerations discussed in "Pulse and Digital Circuits" by Jacob Millman and Herbert Taub, McGraw-Hill Book Company, Inc., 1956.

Antenna position control circuit 4 comprises manual sweep circuit 20 and sector scan logic circuit 21 connected through relays 22 and 23 and switch 24 to servo amplifier 25 and antenna drive motor 26 for directing movement of antenna 1. Manual sweep 20 is connected through switch 24 to the servo amplifier to allow an operator to manually control the position of the antenna. The manual sweep circuit may be similar to those employed in conventional manual television antenna positioning systems.

Sector scan logic 21 is connected through relays 22 and 23 and switch 24 (when connected in the positions shown in FIGURE 2) to the servo amplifier to cause the antenna to scan a large sector in search of electromagnetic signals having the predetermined frequency to which the receiver is tuned. CW (clockwise) limit circuit 27 and CCW (counterclockwise) limit circuit 28 are connected through lines 29 and 30, respectively, to the antenna and determine the limits on the directions of rotation of the antenna and therefore define the angular width of the sector scanned by the antenna. The limit circuits may, by way of example, be set so that the antenna scans a sector 350 degrees wide. The limit circuits are adjustable so that no transmitters are located in the sector that is not scanned by the antenna. The limit circuits may each comprise an adjustable limit switch.

In operation, when the television viewer turns on the receiving system and tunes receiver 2 to a particular channel or station to receive an electromagnetic signal having a predetermined frequency, a reset circuit 17 is correspondingly activated and its output on line 16 causes discharge of any signal stored by peak storage 14. The output of the reset circuit on line 31 biases sector scan logic 21 to rotate the antenna clockwise. The outputs of the reset circuit on lines 32 and 33 bias logic circuit 12 and stop circuit 34 to energize relay coils 22′ and 23′ to operate relays 22 and 23 to connect the system to operate in the scan mode.

Receiver 2 is responsive to signals from the antenna that have the predetermined frequency and generates an AGC voltage proportional thereto. This AGC voltage is applied on line 18 to logic circuit 12 and on line 19 to the threshold gate. If the AGC voltage exceeds the threshold established by gate 11, the AGC voltage is stored by the peak storage and is applied on line 15 to the logic circuit. The output of reset circuit 17 on line 32 also prevents comparison of the AGC voltage and the stored peak signal by the logic circuit for a time period long enough for the antenna to make one sweep of the sector (e,g., from the CCW to the CW limit).

When the antenna reaches the clockwise limit, the output of CW limit 27 on line 27′ actuates sector scan logic 21 which biases servo amplifier 25 to rotate the antenna in the counterclockwise direction. The output of the sector scan logic on line 35 triggers CCW (counterclockwise) inhibit circuit 36 which biases the logic circuit to prevent comparison of the AGC voltage and the stored peak signal by the logic circuit during counterclockwise rotation of the antenna. This movement of the antenna allows the peak storage to sample signals received from all directions and to store a signal proportional to the largest received signal prior to the comparison function by the logic circuit. When the antenna reaches the counterclockwise limit, the output of CCW limit 28 actuates sector scan logic 21 to cause the antenna to again rotate in the clockwise direction.

During clockwise rotation of the antenna, logic circuit 12 compares the signal stored by the peak storage with the instantaneous AGC voltage generated by the receiver. When the magnitudes of the stored signal and the instantaneous AGC voltage are substantially equal, an output of the logic circuit de-energizes relay coil 22′ to operate relay 22 to cause the system to switch from the scan mode to the peaking mode. Operation of relay 22 connects peak-seeking circuit 13 to the servo amplifier. The peak-seeking circuit is responsive to the instantaneous AGC voltage from the receiver and causes the antenna to scan a narrow sector including the direction of the peak received signal. A predetermined time after the system switches to the peaking mode, a second output of the logic circuit on line 39 biases stop circuit 34 to de-energize relay coil 23′ and operate relay 23 to disconnect the servo amplifier from the peak-seeking circuit and render the antenna stationary. The second output of the logic circuit is also applied on line 42 to reset circuit 17. If the peak AGC signal is removed from the input to the logic circuit such as by the transmitter being rendered inoperative, reset circuit 17 automatically resets the system and causes the system to return to the scan mode to again search for signals having the predetermined frequency. If the antenna is not aligned satisfactorily, the system may be reset by actuating manual reset switch 45 to cause the antenna to again scan the sector in search of electromagnetic signals having the predetermined frequency. When the receiver is tuned to receive signals having a different frequency, reset 17 is automatically actuated by an output of the receiver on line 47.

Figures 3, 4, 5:
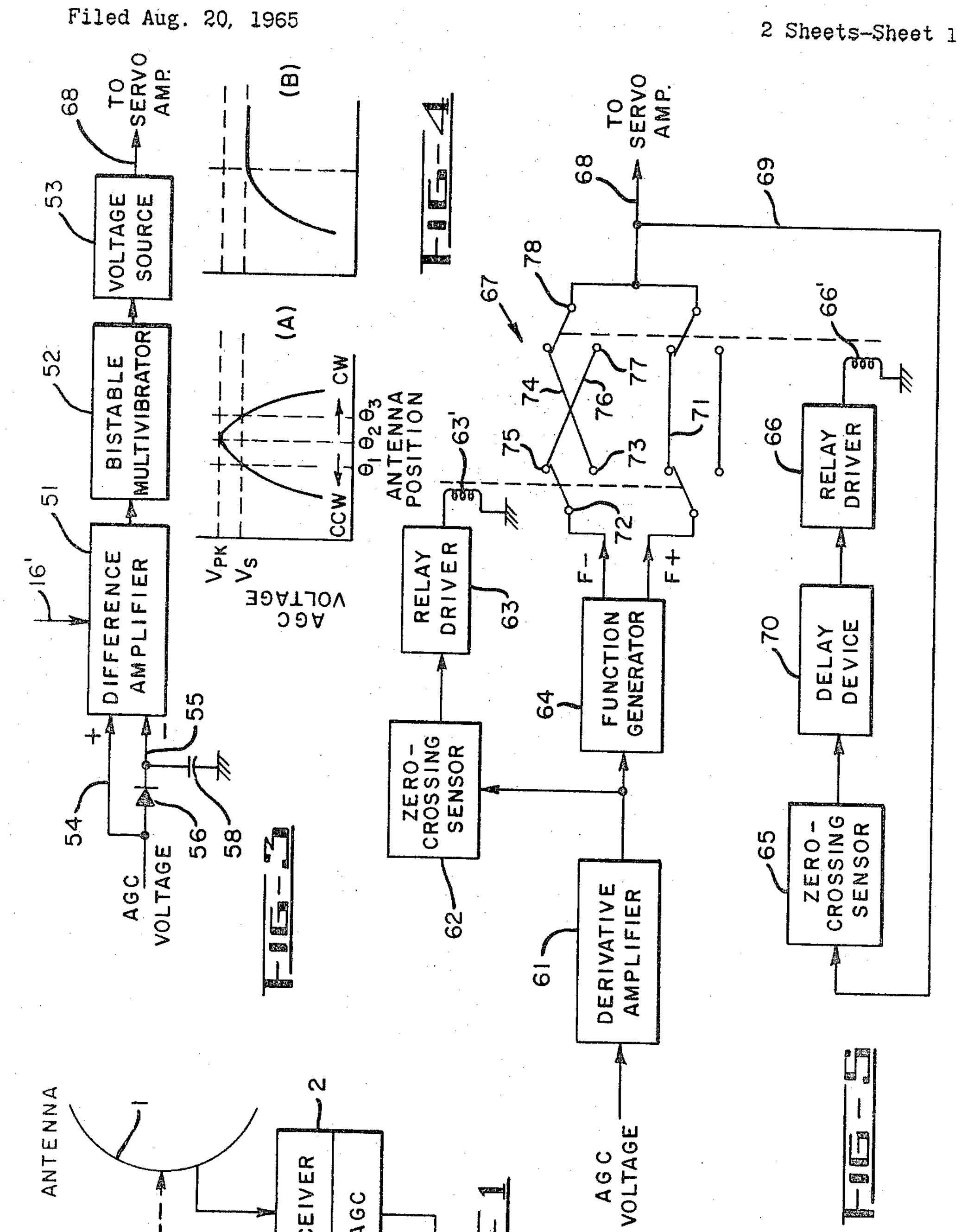
FIGURE 3 is a detailed schematic and block diagram of the peak-seeking circuit of FIGURE 2.
FIGURE 5 is a detailed schematic and block diagram of another embodiment of the peak-seeking circuit of FIGURE 2.

One embodiment of peak-seeking circuit 13 is illustrated in FIGURE 3 and comprises difference amplifier 51, bistable multivibrator 52 (including steering diodes not shown) and voltage source 53 having an output connected through relay 23 to the servo amplifier. Difference amplifier 51 may be a high gain operational amplifier having a first input connected through line 54 to the AGC voltage and having a second input connected through line 55 and steering diode 56 to the AGC voltage. The second input to the difference amplifier is also connected through storage capacitor 58 to a reference potential such as ground. The operation of the difference amplifier is such that when the input on line 55 is less than the input on line 54, the output of the difference amplifier is a positive voltage. Conversely, when the input on line 55 is greater than the input on line 54, the output of the difference amplifier is a negative voltage. Bistable multivibrator 52 is responsive only to the negative output of the difference amplifier for changing operating states.

A plot of the AGC voltage as a function of the angular position of the antenna is illustrated in FIGURE 4A. A plot of the voltage stored by capacitor 58 is illustrated in FIGURE 4B. When the antenna scans the sector, the AGC voltage forward biases steering diode 56 and charges capacitor 58 to a peak voltage $V_s$ (see FIGURE 4B). The signal stored by the capacitor is less than the peak value $V_{pk}$ of the AGC voltage (see FIGURE 4A) by the voltage drop of steering diode 56. The signal stored by the capacitor remains constant at this peak value until a control signal is received on line 16′.

Peak-seeking circuit 13 is connected through relays 22 and 23 to the servo amplifier during clockwise rotation of the antenna through the angular position $\theta_2$. The AGC voltage on line 54 is therefore greater than the peak stored signal on line 55 (see FIGURES 4A and 4B, position $\theta_2$) and the difference in potential between the inputs to the amplifier is positive. As the antenna sweeps past the position of the peak received signal (see FIGURE 4A, position $\theta_2$), the AGC voltage on line 54 decreases whereas the signal stored by capacitor 58 remains constant. When the magnitude of the AGC voltage on line 54 becomes less than the peak signal stored by capacitor 58 (see FIGURE 4A, position $\theta_3$), the difference in potential between the signals applied to the amplifier becomes negative and the output of the amplifier is a negative voltage. The negative output of the amplifier causes bistable multivibrator 52 to switch operating states to change the bias potential applied to the servo amplifier to rotate the antenna counterclockwise (from position $\theta_3$ to $\theta_1$, see FIGURE 4A).

As the antenna moves through position $\theta_3$ on its movement toward position $\theta_1$, the AGC voltage on line 54 becomes greater than the signal stored by capacitor 58 and the difference in potential between the inputs to the amplifier goes positive and the output of the amplifier is a positive voltage. Bistable multivibrator 52 is not responsive to this positive output voltage of the amplifier, however, and the antenna continues to rotate counterclockwise toward position $\theta_1$.

When the antenna rotates past position $\theta_1$, the AGC voltage on line 54 again becomes less than the signal stored by capacitor 58 and the difference in potential between the inputs to the amplifier is again negative causing the amplifier to generate a negative output voltage. This negative output of the difference amplifier causes the bistable multivibrator to bias the servo amplifier to rotate the antenna clockwise (from position $\theta_1$ to $\theta_3$ in FIGURE 4A).

This operation of peak-seeking circuit 13 continues until the output of logic circuit 12 on line 39 actuates the stop circuit to stop movement of the antenna. In an actual embodiment of this circuit, the antenna was aligned with the direction of the peak received signal (see FIGURE 4A, position $\theta_2$) within one-quarter of the antenna beamwidth.

A modified form of peak-seeking circuit 13 that converges the angular position of the antenna to the exact position of the peak received signal is illustrated in FIGURE 5. This circuit comprises a derivative amplifier 61 that is responsive to the AGC voltage, a first zero-crossing sensor 62 and associated relay driver 63, a function generator 64, and a second zero-crossing sensor 65 and associated relay driver 66. The outputs of function generator 64 are connected through the relay contacts indicated at 67 and are coupled through relays 22 and 23 (see FIGURE 2) to the servo amplifier to control rotation of the antenna.

Amplifier 61 generates an output that is proportional to the derivative or rate of change of the magnitude of the AGC voltage and the received signal. When the antenna is aligned in the direction of the peak received signal (see FIGURE 4A, position $\theta_2$), the derivative of the AGC voltage is zero and the output of amplifier 61 is zero volts. The output of the derivative amplifier is a positive voltage when the received signal increases toward the peak value and is a negative voltage when the received signal decreases from the peak value (whether the antenna is rotating clockwise or counterclockwise). Amplifier 61 may, by way of example, be of the type described in "Electronic Analog Computers" by Granino Korn and Theresa Korn, McGraw-Hill Book Co., Inc., 1956.

The pattern of most antennas is approximately parabolic and may be represented by the relationship $$y=a\theta^2$$

where $y$ is the magnitude of the received signal, $a$ is a constant and $\theta$ is the angular position of the antenna. Function generator 64 produces an output that is proportional to the square root of the output of the derivative amplifier in order to shape this signal to generate an error signal representative of the signal required to converge the antenna to the position of the peak received signal. This shaping of the output of the derivative amplifier maintains the closed-loop gain of the system constant to insure stability of the system. One output of function generator 64 is a positive voltage for rotating the antenna clockwise. The other output of the function generator is a negative voltage for rotating the antenna counterclockwise.

Zero-crossing sensor 62 is responsive to the output of amplifier 61 for reversing the polarity of its output when the amplifier output reaches zero (when the antenna is aligned in the direction of the peak received signal), the point at which the output of the derivative amplifier changes polarity. The output of sensor 62 is a negative voltage when the amplifier output is negative and is a positive voltage when the amplifier output is positive. The outputs of sensor 62 are connected to relay driver 63 which selectively connects the outputs of the function generator to the servo amplifier. Zero-crossing sensor 62 may comprise an operational amplifier.

The output of function generator 64 that is applied to the servo amplifier is also applied to zero-crossing sensor 65. When the output of amplifier 61 changes polarity, zero-crossing sensor 65 is activated to reverse the polarity of its output. The output of sensor 65 is delayed by delay device 70 for a time equal to that required by the servo to reverse the direction of rotation of the antenna in response to a change in the polarity of the output of the function generator that is applied to the servo. Relay driver 66 is responsive to the output of sensor 65 for actuating relay contacts indicated at 67 to maintain connection of the correct output of the function generator to the servo amplifier to rotate the antenna in the direction of the peak received signal.

The operation of the peak-seeking circuit of FIGURE 5 will now be described. Consider that a peak signal is stored by peak storage circuit 14 (see FIGURE 2) and that the antenna is rotating clockwise toward the direction of the peak received signal. Consider also that the relay contacts indicated at 67 are connected as illustrated in FIGURE 5 such that the positive output voltage from function generator 64 is connected through line 71 to line 68. When the instantaneous AGC voltage approaches the peak storage signal within a prescribed limit, logic circuit 12 actuates relay 22 and connects peak-seeking circuit 13 to the servo amplifier to cause the system to operate in the peak-seeking mode.

As the antenna rotates clockwise toward the direction of the peak received signal (see FIGURE 4A, position $\theta_1$ to $\theta_2$), the positive output of the derivative amplifier approaches zero. When the antenna passes the direction of the peak received signal, the AGC voltage decreases and the output of the derivative amplifier reverses polarity. Simultaneously, the polarity of the outputs of zero-crossing sensors 62 and 65 are reversed. The negative output of zero-crossing sensor 62 biases relay driver 63 to de-energize relay 63' to connect the negative output voltage of the function generator through relay contacts 72 and 73 and line 74 to the servo amplifier to reverse the direction of rotation of the antenna. Since the servo system does not respond instantaneously to the antenna drive signal from the function generator, there may be a slight overshoot of the antenna past the position of the peak received signal. The negative output of sensor 65 is delayed by the delay device.

During the time for the servo system to respond to the change in the output of the function generator and reverse the direction of rotation of the antenna, the antenna may have rotated to the position $\theta_3$ (see FIGURE 4A). When the direction of rotation of the antenna actually reverses and the antenna moves toward the direction of the peak received signal (see FIGURE 4A, position $\theta_3$ to $\theta_2$), the polarity of the output of the derivative amplifier again reverses Sensor 62 is responsive to this voltage change and biases relay driver 63 to energize relay 63' to connect the positive output voltage of the function generator through line 71 to the servo amplifier. The delayed output of sensor 65, however, simultaneously biases relay driver 66 to energize relay 66' to connect the negative output of the function generator through contacts 72 and 75, line 76, and contacts 77 and 78 to the servo amplifier to continue to rotate the antenna counterclockwise toward the direction of the peak received signal.

As the antenna rotates counterclockwise toward the direction of the peak received signal, the output of the derivative amplifier again approaches zero. When the amplifier output again passes through zero, sensor 62 again actuates relay driver 63 to de-energize relay 63' to actuate switch 67 to connect the positive output voltage of the function generator to the servo amplifier to cause the antenna to rotate clockwise. When the direction of rotation of the antenna actually reverses, the output of sensor 62 and the delayed output of sensor 65 again actuate the associated relays to maintain the same connection of the output of the function generator in order to rotate the antenna toward the direction of the peak received signal. Peak-seeking circuit 13 continues to operate in this manner such that each successive scan of the antenna sweeps a sector having a smaller angular width, which converges to the direction of the peak received signal, until movement of the antenna is stopped after a predetermined time interval or when the angular width of the sector reaches a predetermined minimum value. In an actual embodiment of this circuit, the antenna was aligned with the direction of the peak received signal (see FIGURE 4A, position $\theta_2$) within 10% of the antenna beam width.

It is seen from the above description that this invention provides a practicable system for automatically aligning a directional antenna with the direction of a received signal.

Although this invention has been described in relation to particular embodiments thereof, various modifications will be apparent to those skilled in the art. The scope of the invention is therefore to be determined from the following claims rather than from the above detailed description.

What is claimed is:

1. In combination with an entertainment receiver that generates outputs proportional to the magnitude of received signals having a predetermined frequency and having a rotatable directional receiving antenna, a system for automatically aligning the antenna with the direction of a peak received signal having the predetermined frequency, said system comprising an antenna servo drive system for rotating the antenna, means for generating a first output for causing the antenna to scan a sector and for generating a second output, the first output causing the antenna to initially rotate in one direction, switch means for selectively connecting the first output of said generating means to said servo drive system for rotating the antenna to scan a sector, a peak-seeking circuit comprising a capacitor having a first terminal connected to a reference potential and having a second terminal, a steering diode having a first terminal connected to the second terminal of said capacitor and having a second terminal connected to the output of the receiver, said diode passing to said capacitor for storage thereby the output of the receiver that is greater than the signal stored by said capacitor and preventing discharge of the signal stored by said capacitor, and a difference amplifier circuit having a first input directly electrically connected to the output of the receiver and having a second input connected to the second terminal of said capacitor and having an output, said amplifier circuit generating an output voltage of one polarity for causing the antenna to rotate in one direction when the difference in potential between the output of the receiver and the signal stored by said capacitor is of one polarity and generating an output of the opposite polarity for causing the antenna to rotate in the opposite direction when the difference in potential between the outputs of the receiver and the signal stored by said capacitor is of the opposite polarity, a storage circuit for storing the peak value of the outputs of the receiver that are greater than a predetermined value, and a logic circuit for comparing the outputs of the receiver and said storage circuit for generating a first output when the difference in potential between the input signals is a predetermined value and for generating a second output a predetermined time after generating the first output, said logic circuit being responsive to the second and first outputs of said generating means for preventing comparison of the outputs of the receiver and said storage circuit during initial rotation of the antenna in the one direction and during rotation of the antenna in the opposite direction, respectively, said switch means being responsive to the first output of said logic circuit for connecting the output of said difference amplifier circuit to said servo drive system for causing the antenna to hunt about the direction of the peak received signal and being responsive to the second output of said logic circuit for rendering the antenna stationary.

2. In a system including an entertainment receiver that generates outputs proportional to the magnitude of received signals having a predetermined frequency and having a rotatable directional receiving antenna, a system for automatically aligning the antenna with the direction of a peak received signal having the predetermined frequency, said system comprising an antenna servo drive system for rotating the antenna, means for generating a first output for causing the antenna to scan a sector and for generating a second output, the first output causing the antenna to initially rotate in one direction, first switch means for selectively connecting the first output of said generating means to said servo drive system for rotating the antenna to scan a sector, a peak-seeking circuit comprising means for generating an output that is proportional to the derivative of the output of the receiver, said derivative generating means generating an output of one polarity when the derivative increases and generating an output of the opposite polarity when the derivative decreases, a function generator responsive to the output of said derivative generating means for generating outputs of opposite polarity that are proportional to the absolute value of the derivative of the output of the receiver, a first zero-crossing sensor for sensing the change in polarity of the output of said derivative generating means for generating an output of the same polarity, second switch means responsive to the output of said first sensor for selectively alternately connecting the outputs of said function generator to the output of said peak-seeking circuit for rotating the antenna in opposite directions when the output of said first sensor changes polarity, a second zero-crossing sensor responsive to the output of said peak-seeking circuit for sensing the change in polarity of the output thereof for generating an output, and a delay device for delaying the output of said second zero-crossing sensor for a time equal to the response time of said servo drive system and having an output connected to said second switch means, said second switch means being responsive to the output of said delay device for alternately maintaining the connection of the output of said function generator to the output of said peak-seeking circuit when the direction of rotation of the antenna reverses for rotating the antenna toward the direction of the peak received signal, a storage circuit for storing the peak value of the output of the receiver that is greater than a predetermined value, and a logic circuit for comparing the outputs of the receiver and said storage circuit for generating a first output when the difference in potential between the input signals is a predetermined value and for generating a second output when movement of the antenna satisfies a prescribed condition after generating the first output, said logic circuit being responsive to the second and first outputs of said generating means for preventing the comparison function during initial rotation of the antenna in the one direction and during rotation of the antenna in the opposite direction, respectively,
  said first switch means being responsive to the first output of said logic circuit for connecting the output of said peak-seeking circuit to said servo drive system for causing the antenna to converge toward the direction of the peak received signal, and being responsive to the second output of said logic circuit for rendering the antenna stationary.

3. In combination with a receiver that generates outputs proportional to the magnitude of received signals having a prescribed characteristic and having a rotatable directional receiving antenna, a system for automatically aligning the antenna in the direction of a peak received signal having the prescribed characteristic, said system comprising
  a servo drive system for rotating the antenna,
  means for generating an output for causing the antenna to rotate,
  switch means for selectively connecting the output of said generating means to said servo drive system for rotating the antenna,
  a storage circuit for storing the peak value of the outputs of the receiver,
  a peak-seeking circuit responsive to the output of the receiver for generating outputs for reversing the direction of rotation of the antenna when the antenna passes the direction of the peak received signal,
  a logic circuit for comparing the outputs of the receiver and said storage circuit for generating an output when the difference between the input signals is a predetermined value, said logic circuit having an output,
  said switch means being responsive to the output of said logic circuit for connecting the output of said peak-seeking circuit to said servo system for controlling rotation of the antenna.

4. The system according to claim 3 wherein said peak-seeking circuit comprises
  a capacitor having a first terminal connected to a reference potential and having a second terminal,
  a steering diode having a first terminal connected to the second terminal of said capacitor and having a second terminal connected to the output of the receiver, said diode passing to said capacitor for storage thereby the receiver output that is greater than the signal stored by said capacitor and preventing discharge of the signal stored by said capacitor, and
  a difference amplifier having a first input directly electrically connected to the output of the receiver and having a second input connected to the second terminal of said capacitor and having an output electrically connected through said switch means to said servo drive system, said amplifier generating an output of one polarity for causing the antenna to rotate in one direction when the difference in potential between the output of the receiver and the signal stored by said capacitor is of one polarity and generating an output of the opposite polarity for causing the antenna to rotate in the opposite direction when the difference in potential between the outputs of the receiver and the signal stored by said capacitor is of the opposite polarity.

5. The system according to claim 3 wherein said peak-seeking circuit comprises
  means for generating an output that is proportional to the derivative of the output of the receiver,
  a function generator receiving the output of said derivative generating means for generating a pair of outputs of opposite polarity that are each proportional to the derivative of the output of the receiver,
  a first sensor responsive to the output of said derivative generating means for generating an output, and
  second switch means responsive to the output of said first sensor for selectively connecting an output of said function generator to said servo drive system for reversing the direction of rotation of the antenna.

6. The system according to claim 5 including a second sensor responsive to the output of said peak-seeking circuit for generating an output when the polarity of the output of said function generator changes, said second switch means being responsive to the output of said second sensor for alternately maintaining the connection of the output of said function generator to said servo drive system when the direction of rotation of the antenna reverses for rotating the antenna toward the direction of the peak received signal.

7. In combination with a receiver that generates outputs proportional to the magnitude of received signals having a prescribed characteristic and having a rotatable directional receiving antenna, a system for automatically aligning the antenna with the direction of a peak received signal having the prescribed characteristic, said system comprising
  a servo drive system for rotating the antenna,
  means for generating an output for causing the antenna to rotate to scan a sector,
  switch means for selectively connecting the output of said generating means to said servo drive system for rotating the antenna,
  a storage circuit for storing the peak value of the outputs of the receiver,
  a logic circuit for comparing the outputs of the receiver and said storage circuit for generating a first output when the difference between the input signals is a predetermined value and for generating a second output when movement of the antenna satisfies a prescribed condition after said logic circuit generates the first output, said logic circuit being responsive to the output of said generating means for preventing performing the comparison function during rotation of the antenna in one direction, and
  a difference circuit having a first input connected to the output of said storage circuit and having a second input connected to the ouput of the receiver, said difference circuit generating an output of one polarity when the difference in potential between the inputs is positive and an output of the opposite polarity when the difference in potential between the inputs is negative,
  said switch means being responsive to the first output of said logic circuit for connecting the output of said difference circuit to said servo system for controlling rotation of the antenna, and being responsive to the second output of said logic circuit for rendering the antenna stationary.

8. In combination with a receiver that generates outputs proportional to the magnitude of received signals having a predetermined frequency and having a rotatable directional antenna, a system for automatically aligning the antenna in the direction of a peak received signal having the predetermined frequency, said system comprising
  a servo system for rotating the antenna,
  means for generating an output for causing the antenna to rotate to scan a sector and for generating a second output, the first output initially causing the antenna to rotate in one direction,
  switch means for selectively connecting the output of said generating means to said servo system for rotating the antenna,
  a storage circuit for storing the peak value of the outputs of the receiver, and
  a logic circuit for comparing the outputs of the receiver and the output of said storage circuit for generating an output when the difference in magnitude between the receiver output and the stored signal is a prescribed value, said logic circuit being responsive to the second and first outputs of said generating means for preventing performing the comparison function during initial rotation of the antenna in one direction and during rotation of the antenna in the opposite direction, respectively, said switch means being responsive to the output of said logic circuit for stopping rotation of the antenna.

9. In combination with a receiver generating outputs proportional to the magnitude of received signals having a prescribed characteristic and having a rotatable directional antenna, a system for automatically aligning the antenna in the direction of a peak received signal having the prescribed characteristic, said system comprising a drive system for rotating the antenna, a storage circuit for storing the peak value of the outputs of the receiver, and a logic circuit having a first input connected to the output of the receiver and having a second input connected to the output of said storage circuit, said logic circuit comparing the input signals for generating an output when movement of said antenna satisfies a prescribed condition, said drive system being responsive to the output of said logic circuit for stopping rotation of the antenna.

10. A system for automatically aligning a rotatable directional antenna with the direction of a peak received signal having a prescribed characteristic, said system comprising a rotatable directional antenna, a drive system for rotating said antenna, utilization apparatus responsive to signals received by said antenna for generating outputs proportional to received signals having the prescribed characteristic, and a peak-seeking circuit responsive to the output of said utilization apparatus for storing the peak value thereof, said circuit generating outputs biasing said drive system to rotate said antenna to scan a small sector including the direction of the stored peak signal.

No references cited.

CHESTER L. JUSTUS, *Primary Examiner.*

B. L. RIBANDO, *Assistant Examiner.*